April 11, 1933.  A. H. SHOEMAKER  1,903,574
AUTOMOBILE TIRE
Original Filed March 1, 1928

INVENTOR
Alvin H. Shoemaker
BY
Fred C. Matheny
ATTORNEY

Patented Apr. 11, 1933

1,903,574

UNITED STATES PATENT OFFICE

ALVIN H. SHOEMAKER, OF SEATTLE, WASHINGTON

AUTOMOBILE TIRE

Refiling of abandoned application Serial No. 258,178, filed March 1, 1928. This application filed April 24, 1929. Serial No. 357,875.

My invention relates to pneumatic tires and my present application constitutes a re-filing of my prior abandoned application Serial No. 258,178, filed Mar. 1, 1928.

The objects of my invention are to provide a tire which in manufacture is vulcanized before attaching the non-elastic beads thus cheapening the cost of production and making it possible to permanently reduce the diameter of the tire at the time the beads are attached thereby compressing the rubber in the tire, increasing the density of said rubber, producing a tire in which external cuts will tend to close up rather than open up, making the tire more resistant to puncture and self sealing in the event of puncture, and generally increasing the wearing qualities of the tire.

The method of producing these tires is to construct the tires oversize and after they have been put through the vulcanizing process to reduce the size of the tire by drawing in on the same at the location of the beads thus putting the rubber or elastic material of the tire under substantially uniform compression or increasing the density of the same. The degree to which the density is increased will depend on the amount the tire is reduced in diameter, it being preferable to increase the density enough to leave the rubber under compression when the tire is applied and inflated but it being possible to increase the density only enough to offset or partially offset the stretching due to inflation when the tire is put into service. The usual tire has a normal and natural density when not inflated and is stretched by inflation so that a cut made in the outer wall of the same will tend to open up. In my present tire the rubber may actually be in a compressed state after the tire is applied and inflated so that any cut or puncture will tend to close up and remain closed and the wearing qualities of the tire increased, it being evident that rubber in a compressed state will have greater wearing qualities than the same rubber will when used under tension or in a stretched condition.

In my preferred embodiment herein disclosed I hold the tire in a contracted condition by means of non-elastic bead rings which are applied after the tire is vulcanized. The same result may be accomplished by providing means on the wheel rim for contracting the tire at the time it is applied to the rim.

Other and more specific objects of the invention will be apparent from the following description taken in connection with the accompanying drawing.

In the accompanying drawing illustrating by way of example a preferred form of my invention:

Figure 1:
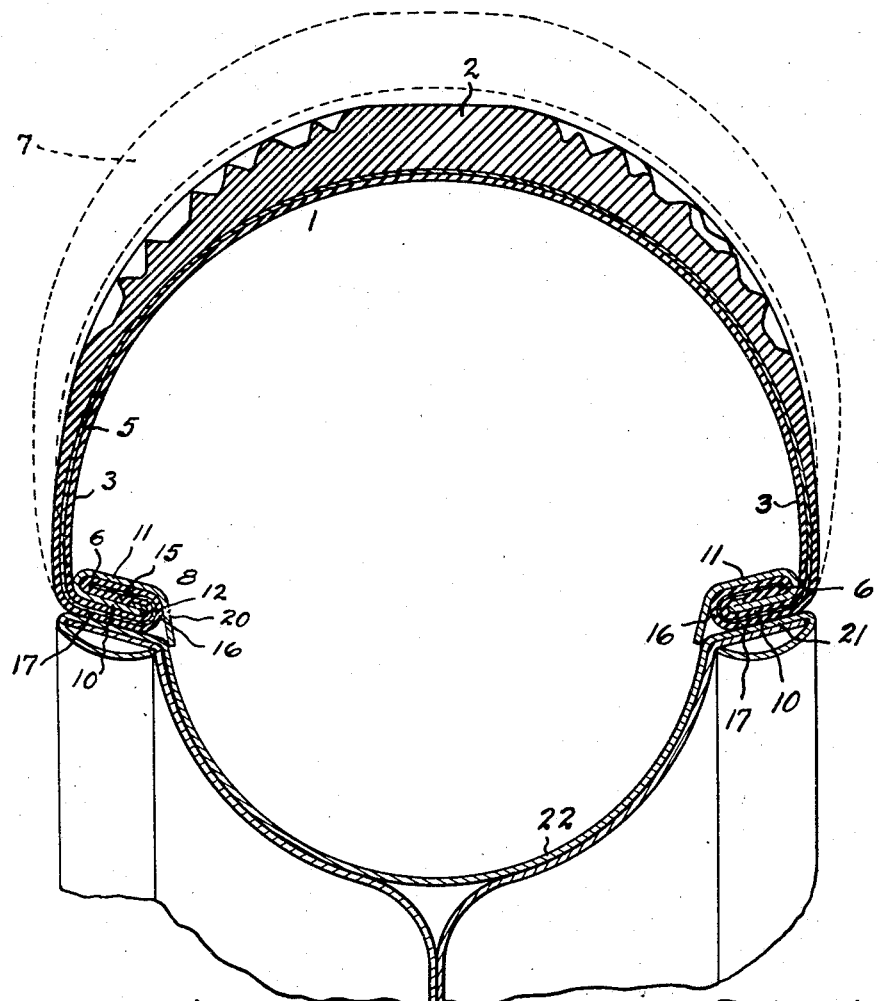
Figure 1 is a view in cross section of an automobile tire embodying my invention shown mounted upon a suitable wheel rim.
Figure 2:
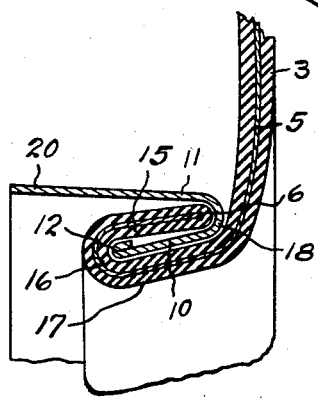
Fig. 2 is a fragmentary view in cross section of my improved tire showing particularly a bead portion thereof, together with the bead ring illustrated in the process of being joined thereto.
Figure 3:
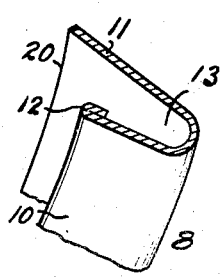
Fig. 3 is a fragmentary view in cross section of a bead ring element of the invention, shown detached.

Referring to said views, the reference numeral 1 indicates generally an automobile tire casing including a rubber tread portion 2 and oppositely disposed side walls 3. Said casing also includes a plurality of closely laid cords 5 extending in parallel transversely of the casing terminating at the end of said side walls, as at 6, and entirely imbedded in the rubber material of the casing. The original size and form of said casing is indicated in broken lines 7 of Fig. 1.

As illustrative of one form of non-elastic bead rings which may be applied after the tire is made and vulcanized a sheet metal ring 8 is provided for connection with each of the inner edges of the side walls 3 to form a bead thereat. Said ring is formed of substantially U-shape in cross section of which the lower flange 10 is of somewhat shorter length than its upper flange 11, the inner edge of the flange 10 being turned over upon itself to form a bead 12. A space 13 is thus provided between the flanges 10 and 11 into which the inner marginal edge of the respective side wall 3 is inserted, as at 15, through the contraction of the casing throughout its circumference, as will be hereinafter explained.

The said marginal edges of the side walls extend about the bead 12, as at 16, and under the flange 10 of the ring in a fold 17 and thence upwardly about the folded portion 18 of the ring to form the finished side wall of the casing. When the tire edges have been thus folded within the ring 8, the latter is pressed together upon the tire portion to secure the latter therein, the inner edge 20 of the flange 11 being pressed downwardly over the fold 16 of the tire edge and binding said ring firmly upon the tire edge to form a bead.

The flanges 10 and 11 of the bead rings are inclined in parallel relatively outwardly and upwardly to engage in parallel with the outwardly inclined ledges 21 of a wheel rim 22 of similar form to that shown in my prior patent application Serial No. 69,995, filed November 19, 1925. In such manner the cushion fold 17 of the bead will engage the inclined face of the ledge 21 and under the outward pressure of the compressed air contained within the tire and rim chamber will cause the tire to seat securely and to retain the air pressure within the said chamber, without the use of an inner tube.

The periphery of the tire casing is placed under substantially uniform compression during the process of forming the beads thereon. This contraction of the tire periphery may be accomplished by any suitable devices, and, when the terminal edges of the side walls are confined within the bead rings, the casing will retain its contracted size or diameter wherein the tread portion 2 is maintained in a more dense condition which it will retain even after the inflation of the tire, as the cords 5 will maintain the tire against but slight increase in size. Such added density to the casing will increase the wearing qualities of the tire and extend its active life, besides which the casing is less subject to puncture.

Advantages in reduced cost of manufacture will result from the use of the present invention. The casings, when formed and vulcanized without the beads thereon, may be manufactured with considerably less cost and avoid a great many chances of forming defective tires and the losses consequent thereto.

This invention contemplates the employment of a reinforcing cord structure somewhat similar to that embodied in my prior Patent No. 1,510,709, wherein the cords extend in parallel transversely of the tire. This form of cord structure is advantageous in the present invention as but one or two layers or plies of cords are required, but it is evident that any other equivalent or suitable form of fabric or cord reinforcement may be employed.

Having described my invention, what I claim is:

1. As an article of manufacture, a one-piece pneumatic tire having its transverse curvature on an arc of approximately 180°, cord reinforcing means extending radially of the tire and means engaging the lateral edges of the tire and adapted when engaged therewith to hold the periphery of the tire in a circumferentially compressed condition.

2. As an article of manufacture, a one-piece pneumatic tire having its transverse curvature on an arc of approximately 180°, cord reinforcing means extending radially of the tire and means engaging the lateral edges of the tire and adapted when engaged therewith to hold the periphery of the tire in a circumferentially compressed condition, said means forming a permanent part of said tire in its completed form.

3. In a tire of the character described, a one-piece pneumatic tire having its transverse curvature on an arc of approximately 180°, cord reinforcing means extending radially of the tire, said tire being constructed oversize and means engaging the lateral edges of the tire and adapted when engaged therewith to hold the periphery of the tire in a circumferentially compressed condition with the tire reduced to normal size.

4. As an article of manufacture, a one-piece pneumatic tire having its transverse curvature on an arc of approximately 180°, cord reinforcing means extending radially of the tire and means engaging the lateral edges of the tire and adapted when engaged therewith to hold the periphery of the tire in a circumferentially compressed condition, said means forming a permanent part of said tire in its completed form, and including annular channels having the lateral edges of the tire interlockingly retained therein.

The foregoing specification signed at Seattle, Wash., this 28th day of March, 1929.

ALVIN H. SHOEMAKER.